(12) United States Patent
Britstein et al.

(10) Patent No.: US 8,923,836 B2
(45) Date of Patent: Dec. 30, 2014

(54) DEVICE, SYSTEM, AND METHOD OF PHONE CALL PLACEMENT

(71) Applicant: AudioCodes Ltd., Lod (IL)

(72) Inventors: Eliezer Britstein, Beerotaim (IL); Shaul Weissman, Shoham (IL)

(73) Assignee: AudioCodes Ltd., Lod (IL)

( * ) Notice: Subject to any disclaimer, the term of this patent is extended or adjusted under 35 U.S.C. 154(b) by 116 days.

(21) Appl. No.: 13/652,501

(22) Filed: Oct. 16, 2012

(65) Prior Publication Data

US 2014/0106723 A1    Apr. 17, 2014

(51) Int. Cl.
*H04M 3/42*    (2006.01)

(52) U.S. Cl.
USPC ......... 455/417; 455/41.2; 455/41.3; 455/436; 455/437; 455/438; 455/439; 455/440; 455/441; 455/442; 455/443; 455/444; 455/550.1; 455/552.1; 455/553.1; 370/239; 370/241; 370/310.2; 370/322; 370/331; 370/332; 370/333; 370/334; 370/338; 370/395.2; 370/395.21; 370/395.32; 370/395.4; 370/395.41; 370/395.42; 370/395.43

(58) Field of Classification Search
CPC ....... H04W 4/16; H04W 36/30; H04W 84/18; H04W 88/06; H04W 80/04; H04W 84/12; H04M 1/72519; H04B 7/2123

USPC ............. 455/417, 436–444, 41.2, 41.3, 455/550–552.2, 552.1, 553.1; 370/322, 370/239, 241, 331–334, 338, 395.2–395.43
See application file for complete search history.

(56) References Cited

U.S. PATENT DOCUMENTS

| 7,116,970 | B2 * | 10/2006 | Brusilovsky et al. | 455/411 |
| 7,149,521 | B2 * | 12/2006 | Sundar et al. | 455/435.1 |
| 7,707,297 | B2 * | 4/2010 | Haddad | 709/229 |
| 7,860,069 | B2 * | 12/2010 | Wawra et al. | 370/338 |
| 7,920,520 | B2 * | 4/2011 | Zreiq et al. | 370/331 |
| 7,983,218 | B2 * | 7/2011 | Kesavan et al. | 370/331 |
| 2004/0264410 | A1 * | 12/2004 | Sagi et al. | 370/331 |
| 2010/0027510 | A1 * | 2/2010 | Balasubramanian et al. | 370/332 |

* cited by examiner

*Primary Examiner* — Steve D Agosta

(74) *Attorney, Agent, or Firm* — Eitan, Mehulal & Sadot

(57) ABSTRACT

Device, system, and method of phone call placement. A method of placing a phone call from a mobile phone includes: receiving a user command to initiate a phone call from said mobile phone using a cellular network; diverting said phone call to be carried by a detected network element of a non-cellular wireless network, instead of by said cellular network; wherein the diverting is based on at least one of: a Media Access Control (MAC) address of a detected network element of said non-cellular wireless network, an Organizationally Unique Identifier (OUI) of a detected network element of said non-cellular wireless network, or a Session Initiation Protocol (SIP) account configuration data of a detected network element of said non-cellular wireless network.

7 Claims, 4 Drawing Sheets

DEVICE, SYSTEM, AND METHOD OF PHONE CALL PLACEMENT

FIELD

The present invention relates to the field of wireless communication.

BACKGROUND

Many people use cellular phones in order to talk with friends, family and co-workers while being mobile. A cellular phone may allow a user to leave his or her office or home, while maintaining the availability to speak with other people.

Some cellular phones are known as "smartphones", and may allow a user to perform tasks other than placing phone calls. For example, a smartphone may allow a user to send and receive electronic mail (Email) messages, to send and receive text message, to browse the Internet, to capture photographs or video by utilizing an integrated camera, to play games, to download and run software applications, or the like.

SUMMARY

The present invention may include, for example, devices, systems, and methods of placement of phone calls. For example, the present invention may allow automatic placement of an outgoing phone call, from a smartphone or cellular phone, by utilizing a non-cellular packet-based wireless network, instead of using a cellular network.

In accordance with the present invention, a method of placing a phone call from a mobile phone may include: receiving a user command to initiate a phone call from said mobile phone using a cellular network; diverting said phone call to be carried by a detected network element of a non-cellular wireless network, instead of by said cellular network; wherein the diverting is based on at least one of: a Media Access Control (MAC) address of a detected network element of said non-cellular wireless network, an Organizationally Unique Identifier (OUI) of a detected network element of said non-cellular wireless network, or a Session Initiation Protocol (SIP) account configuration data of a detected network element of said non-cellular wireless network.

In accordance with the present invention, the diverting may include: extracting the MAC address of said detected network element; and comparing the MAC address of said detected network element to a list of user-approved MAC addresses stored in said mobile phone.

In accordance with the present invention, the method may include: based on a user command, editing said list of user-approved MAC addresses by performing at least one of: adding a new entry to said list, and deleting an entry from said list.

In accordance with the present invention, diverting may include: extracting the OUI of said detected network element; and comparing the OUI of said detected network element to a list of user-approved OUI values stored in said mobile phone.

In accordance with the present invention, the method may include: based on a user command, editing said list of user-approved OUI values by performing at least one of: adding a new entry to said list, and deleting an entry from said list.

In accordance with the present invention, diverting may include: extracting the SIP account configuration data of the detected network element of said non-cellular wireless network; and checking whether (A) a value of a field of the SIP account configuration data of the detected network element of said non-cellular wireless network, is identical to (B) a value of a corresponding field of the SIP account configuration data of said mobile phone.

In accordance with the present invention, diverting is based on a user approval to divert phone calls to said non-cellular wireless network, wherein the user approval comprises a user approval other than on a call-by-call basis.

In accordance with the present invention, the diverting is based cumulatively on at least two of: a Media Access Control (MAC) address of a detected network element of said non-cellular wireless network, an Organizationally Unique Identifier (OUI) of a detected network element of said non-cellular wireless network, or a Session Initiation Protocol (SIP) account configuration data of a detected network element of said non-cellular wireless network.

In accordance with the present invention, the diverting is based in the alternate on at least two of: a Media Access Control (MAC) address of a detected network element of said non-cellular wireless network, an Organizationally Unique Identifier (OUI) of a detected network element of said non-cellular wireless network, or a Session Initiation Protocol (SIP) account configuration data of a detected network element of said non-cellular wireless network.

In accordance with the present invention, the diverting is based on at least one of: an estimated bandwidth of said non-cellular wireless network; an estimated throughput of said non-cellular wireless network; an estimated Quality of Service (QoS) of said non-cellular wireless network.

In accordance with the present invention, a call placement module for utilization in a mobile phone may include: a call diverter (a) to receive a signal indicating a user command to initiate a phone call from said mobile phone using a cellular network, and (b) to divert said phone call to be carried by a detected network element of a non-cellular wireless network, instead of by said cellular network; wherein the call diverter is to divert said phone call based on at least one of: a Media Access Control (MAC) address of a detected network element of said non-cellular wireless network, an Organizationally Unique Identifier (OUI) of a detected network element of said non-cellular wireless network, or a Session Initiation Protocol (SIP) account configuration data of a detected network element of said non-cellular wireless network.

In accordance with the present invention, the call placement module may include an extractor to extract the MAC address of said detected network element; wherein the call diverter is to compare the MAC address of said detected network element to a list of user-approved MAC addresses stored in said mobile phone.

In accordance with the present invention, the call placement module may include: an editor to edit, based on a user command, said list of user-approved MAC addresses by performing at least one of: adding a new entry to said list, and deleting an entry from said list.

In accordance with the present invention, the call placement module may include: an extractor to extract the OUI of said detected network element; wherein the call diverter is to compare the OUI of said detected network element to a list of user-approved OUI values stored in said mobile phone.

In accordance with the present invention, the call placement module may include: an editor to edit, based on a user command, said list of user-approved OUI values by performing at least one of: adding a new entry to said list, and deleting an entry from said list.

In accordance with the present invention, the call placement module may include: an extractor to extract the SIP account configuration data of the detected network element of said non-cellular wireless network; wherein the call diverter is to check whether (A) a value of a field of the SIP account configuration data of the detected network element of said non-cellular wireless network, is identical to (B) a value of a corresponding field of the SIP account configuration data of said mobile phone.

In accordance with the present invention, the call diverter is to divert said phone call based on a user approval to divert phone calls to said non-cellular wireless network, wherein the user approval comprises a user approval other than on a call-by-call basis.

In accordance with the present invention, the call diverter is to divert said phone call based cumulatively on at least two of: a Media Access Control (MAC) address of a detected network element of said non-cellular wireless network, an Organizationally Unique Identifier (OUI) of a detected network element of said non-cellular wireless network, or a Session Initiation Protocol (SIP) account configuration data of a detected network element of said non-cellular wireless network.

In accordance with the present invention, the call diverter is to divert said phone call based in the alternate on at least two of: a Media Access Control (MAC) address of a detected network element of said non-cellular wireless network, an Organizationally Unique Identifier (OUI) of a detected network element of said non-cellular wireless network, or a Session Initiation Protocol (SIP) account configuration data of a detected network element of said non-cellular wireless network.

In accordance with the present invention, the call diverter is to divert said phone call based on at least one of: an estimated bandwidth of said non-cellular wireless network; an estimated throughput of said non-cellular wireless network; an estimated Quality of Service (QoS) of said non-cellular wireless network.

In accordance with the present invention, the call placement module may be included in a cellular phone, a mobile phone, or a smartphone.

The present invention may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION OF SOME EMBODIMENTS

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Applicants have realized that a smartphone, which may include a cellular transceiver and an additional wireless transceiver, may be configured or adapted to allow automatic placement of an outgoing phone call by utilizing a non-cellular packet-based network. This may be performed by the smartphone upon a user's general request to place an outgoing phone call. The user may not be required to actively select to place a non-cellular wireless phone call, and the user may not even be aware that the smartphone places the outgoing phone call using a non-cellular wireless network.

Applicants have realized that such automatic placement of outgoing phone calls via a non-cellular wireless network may be particularly advantageous in certain scenarios. In a first demonstrative scenario, the user may be located at an area with weak or spotty cellular reception, and the outgoing call may be placed via a trusted and high-bandwidth non-cellular wireless network, thereby providing to the user an increased Quality of Service (QoS) and reducing the possibility for dropped calls. In a second demonstrative scenario, the user may be required to pay for cellular service based on the number of minutes used for talking (e.g., a "limited talk" cellular plan), and diverting the call placement to be performed by a non-cellular wireless network (which may be free, or may be paid for globally and not per-minute) may directly save money to the user.

Figure 1A:
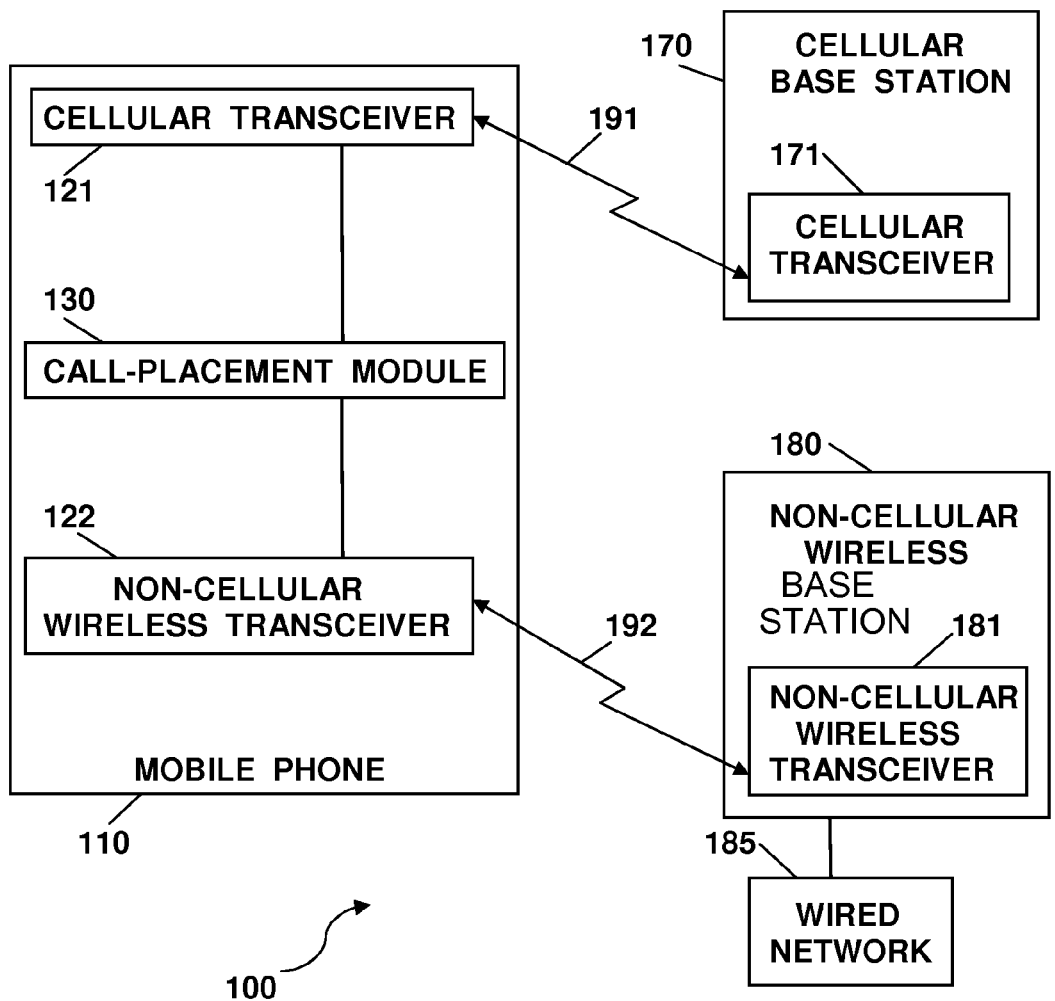
FIG. 1A is a schematic block diagram illustration of a communication system in accordance with the present invention.

Reference is made to FIG. 1A, which is a schematic block diagram illustration of a communication system 100 in accordance with some demonstrative embodiments of the present invention. System 100 may include, for example, a mobile phone 110, a cellular base station 170, and a non-cellular wireless base station 180. Mobile phone 110 may be able to communicate with cellular base station 170 through a cellular wireless communication link 191. Mobile phone 110 may also be able to communicate with non-cellular wireless base station 180 through a wireless communication link 192.

Cellular base station 170 may be or may include, for example, a cellular tower, a cellular transceiver, a cellular antenna, a cellular repeater, or other suitable cellular network element able to send and/or receive cellular communication signals. Cellular base station 170 may be part of a cellular network, which may be operated by and/or associated with a cellular operator. Cellular base station 170 may include a cellular transceiver 171 able to perform cellular communication using one or more cellular communication standards and/or protocols.

Non-cellular wireless base station 180 may be or may include, for example, a wireless Access Point (AP), a wireless router, a wireless repeater, or other device which may allow one or more wireless devices (e.g., mobile phone 110) to connect over a wireless communication link to a wired network 185 (e.g., a node or communication point connected to the Internet). Non-cellular wireless base station 180 may include, for example, a non-cellular wireless transceiver 181 able to communicate using one or more non-cellular wireless networks, communication standards and/or communication protocols.

Mobile phone 110 may be, for example, a cellular phone, a smartphone, or other suitable portable device or mobile device capable of both cellular communication and non-cellular wireless communication. Mobile phone 110 may include, for example, a cellular transceiver 121, a non-cellular wireless transceiver 122, a call placement module 130, and other suitable components as described in greater detail with reference to FIG. 1B.

Figure 1B:
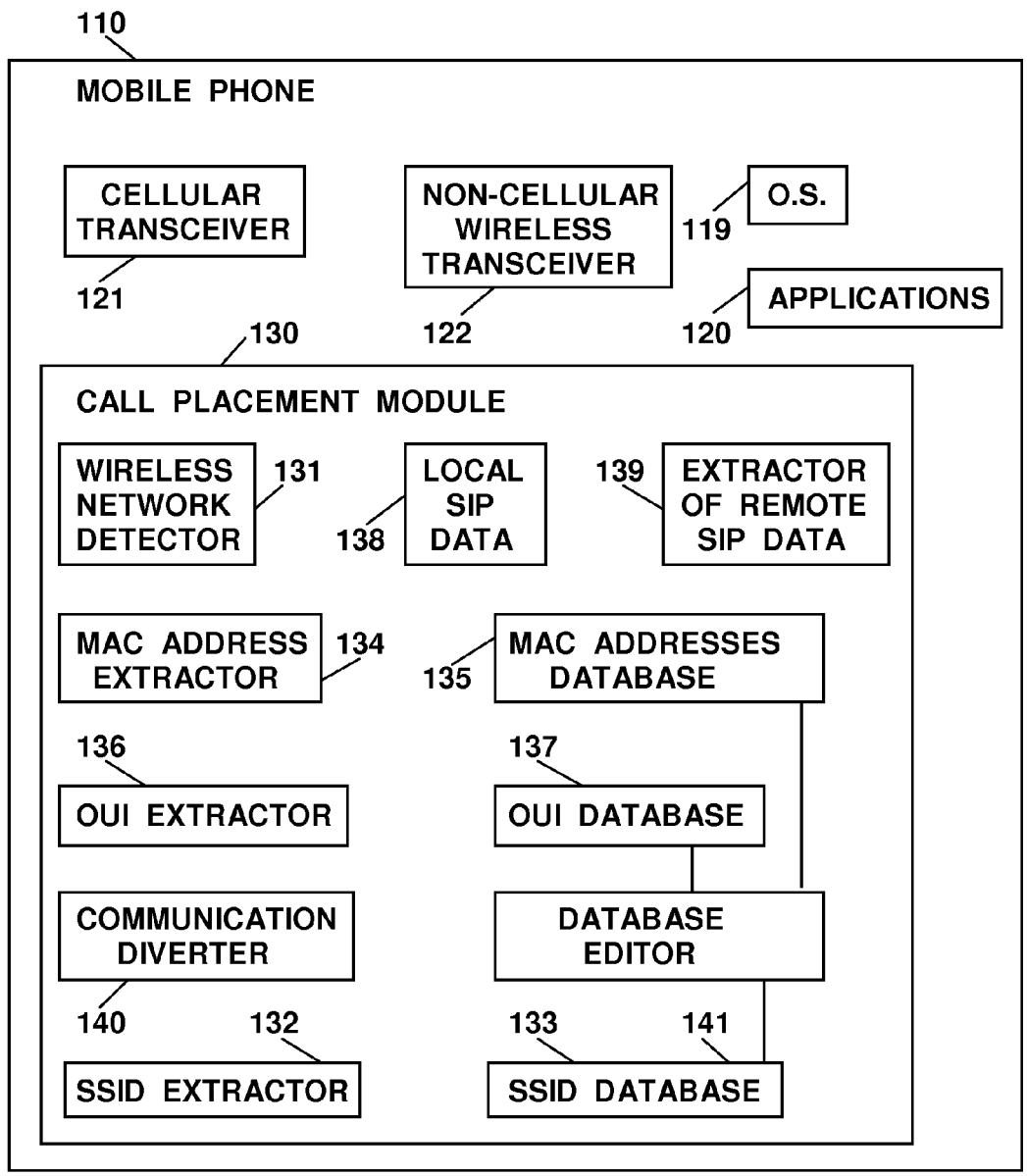
FIG. 1B is a schematic block diagram illustration of a mobile phone in accordance with the present invention.

Reference is made to FIG. 1B, which is a schematic block diagram illustration of mobile phone 110 in accordance with some demonstrative embodiments of the present invention. Mobile phone 110 may include, for example, cellular transceiver 121, non-cellular wireless transceiver 122, call placement module 130, an Operating System (OS) 119, one or more applications 120, and/or other suitable components and/or modules. For example, mobile phone 110 may include a processor (e.g., single core or multiple-core), a memory unit, a storage unit, a display unit, an input unit (e.g., keyboard or keypad), an audio input unit (e.g., microphone), an audio output unit (e.g., one or more speakers), a power source (e.g., a rechargeable battery), or the like.

Cellular transceiver 121 may include a transceiver able to perform cellular communication using one or more cellular communication standards and/or protocols.

Non-cellular wireless transceiver 122 may include a transceiver able to communicate using one or more non-cellular wireless networks, communication standards and/or communication protocols.

OS 119 may include, for example, Android OS, Apple iOS, Microsoft Windows, or other suitable OS which may be installed on mobile phone 110. Applications 120 may include one or more applications which may be installed on mobile phone 110.

In accordance with a demonstrative embodiment of the present invention, call placement module 130 may be a software-based module and/or a hardware-based component able to determine or select whether a phone call is to be placed by utilizing either cellular communication (via cellular transceiver 121), or non-cellular wireless communication (via non-cellular wireless transceiver 122).

Call placement module 130 may determine that a phone call is to be placed by using non-cellular wireless communication, instead of by using cellular communication. As detailed herein, call placement module 130 may reach such determination by using one or more parameters or decisions, for example, based on a Service Set Identifier (SSID) of a detected non-cellular wireless network, based on a Media Access Control (MAC) address of a detected wireless AP or wireless base station, based on a Organizationally Unique Identifier (OUI) of a detected wireless AP or wireless base station, and/or based on Session Initiation Protocol (SIP) account configuration data.

Call placement module 130 may include, for example, a wireless network detector 131, a wireless network SSID extractor 132, a database 133 of approved SSIDs, a wireless base station MAC address extractor 134, a database of approved MAC addresses 135, a wireless base station OUI extractor 136, a database of approved OUIs 137, a local SIP account configuration data 138, an extractor 139 of remote SIP account configuration data, a communication diverter 140, and a database editor 141.

In order to perform call placement based on SSID, wireless network detector 131 may detect whether or not mobile device 110 is located within a communication range of a non-cellular wireless network associated with non-cellular wireless base station 180 (e.g., based on non-cellular wireless signal detection, and/or by taking into account the strength or quality or other parameters of a detected non-cellular wireless signal). Upon detection of a non-cellular wireless network by wireless network detector 131, and optionally, only if the detected non-cellular wireless signal is of a minimum strength or quality, then, wireless network SSID extractor 132 may extract the SSID of the detected non-cellular wireless network, for example, as published wirelessly by non-cellular wireless base station 180. Call placement module 130 may check whether the SSID of non-cellular wireless base station 180 is included as one of the SSIDs stored in database 133 approved SSIDs. If the SSID of non-cellular wireless base station 180 appears in database of approved SSIDs 133, then call placement module 130 may determine that an outgoing phone call initiated by a user of mobile phone 110 is to be placed by using non-cellular wireless communication instead of by using cellular communication. Accordingly, upon an attempt by the user to place a phone call using mobile phone 110, communication diverter 140 may divert the phone call to be placed by using non-cellular wireless communication instead of by using cellular communication.

Optionally, database 133 of approved SSIDs may be populated with values which may be manually entered and/or approved by the user of mobile phone 110. For example, upon detection of a non-cellular wireless network in proximity to mobile phone 110, or upon utilization of such non-cellular wireless network by mobile phone 110, database editor 141 may display or present a question to the user of mobile phone 110, asking the user whether or not this non-cellular wireless network may be added to database of approved SSIDs 133. If the user responds positively, then database editor 141 may add the SSID of that non-cellular wireless network to database of approved SSIDs 133. Database editor 141 may further allow the user of mobile phone 110 to view the content of database 133 of approved SSIDs, to selectively modify or edit the content of database 133 of approved SSIDs, and/or to selectively delete entries from database 133 of approved SSIDs.

Additionally or alternatively, call placement may be performed based on the MAC address of non-cellular wireless base station 180. For example, upon detection of a non-cellular wireless network by wireless network detector 131, wireless base station MAC address extractor 134 may extract the MAC address of non-cellular wireless base station 180, for example, as published wirelessly by non-cellular wireless base station 180. Call placement module 130 may check whether the MAC address of non-cellular wireless base station 180 is included as one of the MAC addresses stored in database 135 of approved MAC addresses. If the MAC address of non-cellular wireless base station 180 appears in database 135 of approved MAC addresses, then call placement module 130 may determine that an outgoing phone call initiated by a user of mobile phone 110, is to be placed by using non-cellular wireless communication instead of by using cellular communication. Accordingly, upon an attempt by the user to place a phone call using mobile phone 110, communication diverter 140 may divert the phone call to be placed by using non-cellular wireless communication instead of by using cellular communication.

Optionally, database 135 of approved MAC addresses may be populated with values which may be manually entered and/or approved by the user of mobile phone 110. For example, upon detection of a non-cellular wireless network in proximity to mobile phone 110, or upon utilization of such non-cellular wireless network by mobile phone 110, database editor 141 may display or present a question to the user of mobile phone 110, asking the user whether or not this non-cellular wireless network may be added to database 135 of approved MAC addresses. If the user responds positively, then database editor 141 may add the MAC address of that non-cellular wireless network to database 135 of approved MAC addresses. Database editor 141 may further allow the user of mobile phone 110 to view the content of database 135 of approved MAC addresses, to selectively modify or edit the content of database 135 of approved MAC addresses, and/or to selectively delete entries from database 135 of approved MAC addresses.

Additionally or alternatively, call placement may be performed based on the OUI of non-cellular wireless base station 180. For example, upon detection of a non-cellular wireless network by wireless network detector 131, wireless base station OUI extractor 136 may extract the OUI of non-cellular wireless base station 180, for example, as published wirelessly by non-cellular wireless base station 180. The OUI may be, for example, a 24-bit number that a vendor or manufacturer or other type of entity (typically referred to as "assignee") may purchase or obtain from IEEE, in order to identify such assignee's products. Call placement module 130 may check whether the OUI of non-cellular wireless base station 180, is included as one of the OUIs stored in database 137 of approved OUIs. If the OUI of non-cellular wireless base station 180 appears in database 137 of approved OUIs, then call placement module 130 may determine that an outgoing phone call initiated by a user of mobile phone 110, is to be placed by using non-cellular wireless communication instead of by using cellular communication. Accordingly, upon an attempt by the user to place a phone call using mobile phone 110, communication diverter 140 may divert the phone call to be placed by using non-cellular wireless communication instead of by using cellular communication.

Optionally, database 137 of approved OUIs may be populated with values which may be manually entered and/or approved by the user of mobile phone 110. For example, upon detection of a non-cellular wireless network in proximity to mobile phone 110, or upon utilization of such non-cellular wireless network by mobile phone 110, database editor 141 may display or present a question to the user of mobile phone 110, asking the user whether or not this non-cellular wireless network may be added to database of approved OUIs 137. If the user responds positively, then database editor 141 may add the OUI of that non-cellular wireless network to database 137 of approved OUIs. Database editor 141 may further allow the user of mobile phone 110 to view the content of database 137 of approved OUIs, to selectively modify or edit the content of database 137 of approved OUIs, and/or to selectively delete entries from database 137 of approved OUIs.

Additionally or alternatively, call placement may be performed based on the SIP account configuration data of non-cellular wireless base station 180. For example, upon detection of a non-cellular wireless network by wireless network detector 131, extractor 139 of remote SIP account configuration data may extract the SIP account configuration data of non-cellular wireless base station 180, for example, as published wirelessly by non-cellular wireless base station 180. Call placement module 130 may check whether the value(s) of one or more fields or parameters of the SIP account configuration data of non-cellular wireless base station 180 (e.g., a "Subscriber ID" field or similar unique customer identifier), are identical to the corresponding values of local SIP account configuration data 138 of mobile phone 110. If the SIP account configuration data of non-cellular wireless base station 180 is partially or entirely identical to local SIP account configuration data 138 of mobile phone 110, then call placement module 130 may determine that an outgoing phone call initiated by a user of mobile phone 110, is to be placed by using non-cellular wireless communication instead of by using cellular communication. Accordingly, upon an attempt by the user to place a phone call using mobile phone 110, communication diverter 140 may divert the phone call to be placed by using non-cellular wireless communication instead of by using cellular communication.

The present invention may utilize one or more of the above-mentioned conditions or parameters, in order to perform call placement. In some embodiments of the present invention, a single condition or parameter from the above list may be utilized. In other embodiments of the present invention, two (or more) conditions or parameters may be utilized in a cumulative way, or by utilizing AND logic. For example, in such demonstrative embodiments, both the SSID value and the OUI value may be cumulatively used; or alternatively, both the OUI value and the MAC address value may be cumulatively used; or other suitable combinations of cumulative conditions, such as a decision to divert the phone call to non-cellular wireless communication may require satisfaction of two conditions, cumulatively. In other embodiments of the present invention, two (or more) conditions or parameters may be utilized in an alternate way, or by utilizing OR logic. For example, in such demonstrative embodiments, a decision to divert a phone call to non-cellular wireless communication may be taken if at least one of two or more conditions (e.g., SSID value, OUI value, MAC address, and/or SIP account configuration data) hold true. Other suitable algorithms may be used, or may be pre-defined or hard-coded into call placement module 130, or optionally, may be selected or modified by the user of mobile phone 110 (e.g., who may command to switch from a cumulative algorithm to an alternate algorithm, or vice versa; or may select the condition(s) or parameter(s) that are taken into account).

Figure 2:
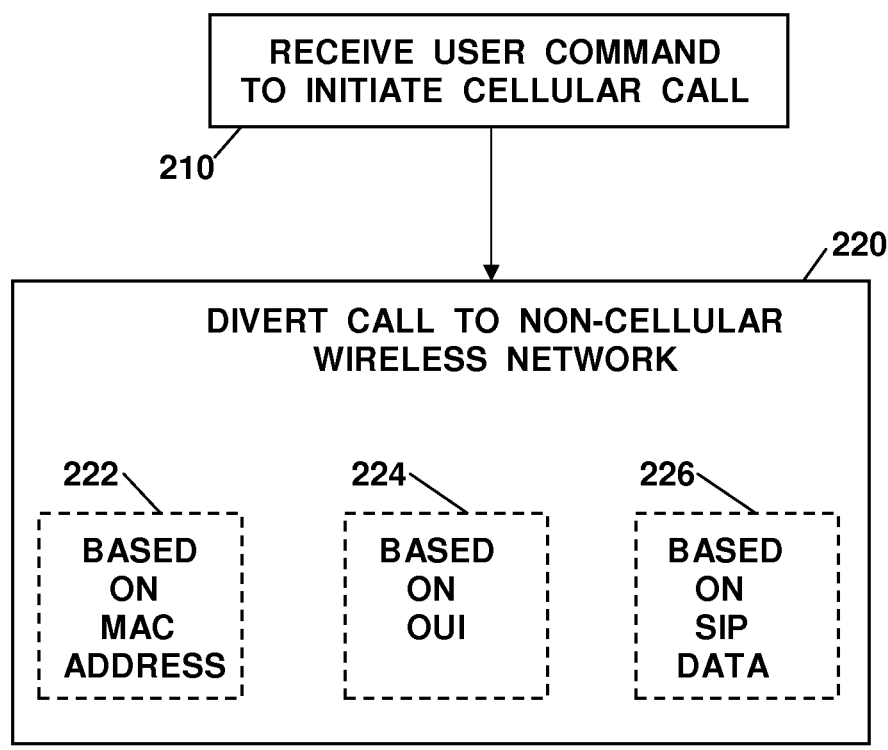
FIG. 2 is a schematic flow-chart diagram of a method for placing phone calls, in accordance with the present invention.

Reference is made to FIG. 2, which is a flowchart of a method of placing a phone call, in accordance with the present invention. The method may be implemented, for example, by using system 100 of FIG. 1, by using mobile phone 110 of FIG. 1, and/or by using other suitable system, device, or component.

The method may include, for example, receiving a user command to initiate a phone call from a mobile phone using a cellular network (block 210).

The method may further include, for example, diverting the phone call to be carried by a detected network element of a non-cellular wireless network, instead of by the cellular network (block 220). Optionally, the diverting may be based on at least one of: a MAC address of a detected network element of the non-cellular wireless network (block 222); a OUI of a detected network element of the non-cellular wireless network (block 224); or SIP account configuration data of a detected network element of the non-cellular wireless network (block 226).

Other suitable operations may be used in accordance with the present invention. In some embodiments of the present invention, the method may be implementable (or may be implemented, or intended for implementing) by using a smartphone or mobile phone which includes at least a hardware component. Some embodiments may utilize other suitable hardware components and/or software modules, for example, cellular call interceptor, call diverter, transceiver selector, parameter extractor, or the like.

Figure 3:
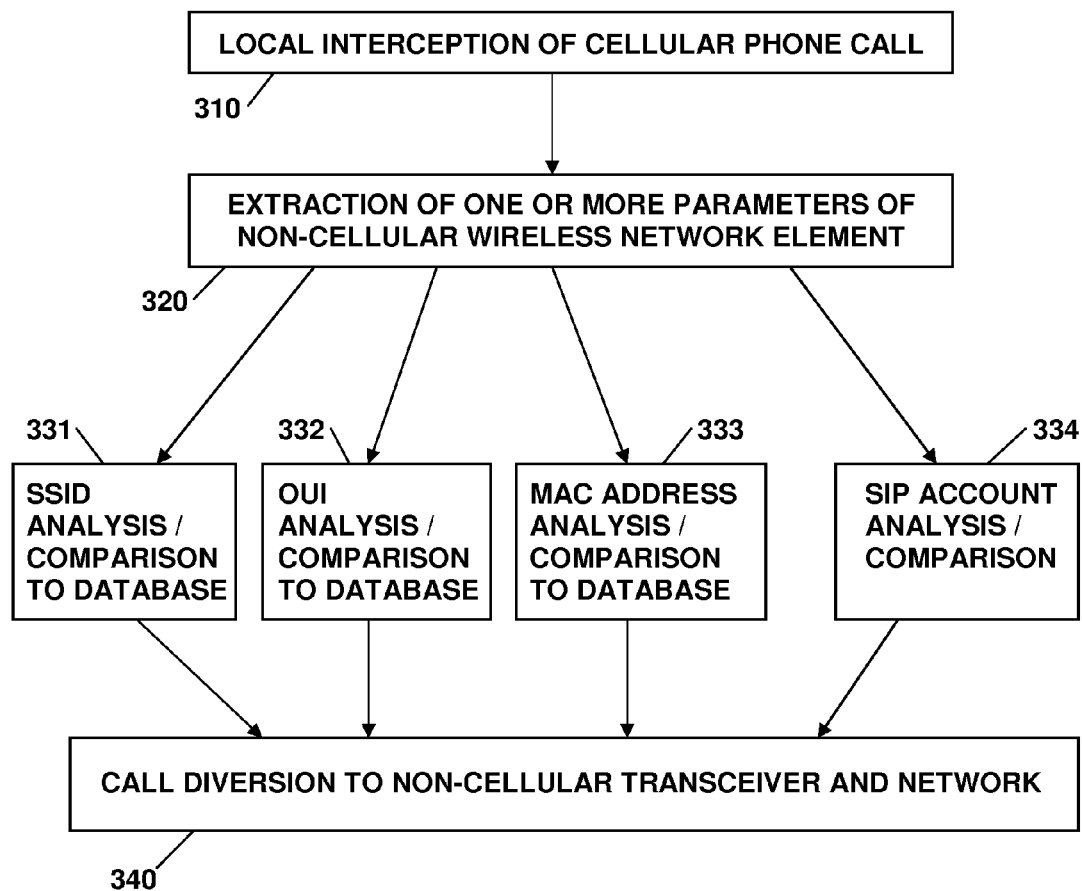
FIG. 3 is a schematic flow diagram demonstrating placement of a phone call, in accordance with the present invention.

FIG. 3 is a schematic flow diagram demonstrating placement of a phone call, in accordance with the present invention. For example, a cellular phone call, or an attempt or command to place a cellular phone call, may be locally intercepted or detected within the mobile phone (block 310). Then, one or more parameters of a non-cellular wireless network may be extracted (block 320). The extracted parameter(s) may be used for analysis and/or comparison (e.g., versus a local database or local list or local data), for example, by utilizing SSID value or descriptor (block 331), OUI value or descriptor (block 332), MAC address value or descriptor (block 333), and/or SIP account configuration data (block 334). Based on the analysis and/or comparison, the intercepted or attempted cellular phone call may be diverted to be carried by a non-cellular wireless network, using the non-cellular wireless transceiver of the mobile phone.

The present invention may allow a user to utilize a non-cellular wireless network instead of utilizing a cellular network, for placement of a phone call via the user's mobile phone. Optionally, this may be performed in a transparent manner, without alerting the user to the fact that the initiated phone call is intercepted or diverted from a cellular network to a non-cellular wireless network.

The present invention may utilize additional parameters and/or other parameters, instead of or in addition to the parameter(s) and/or criteria demonstrated herein. For example, the present invention may obtain and extract, and then inspect or analyze, one or more non-cellular wireless communication parameters (e.g., Wi-Fi parameters), for example, Received Signal Strength Indicator (RSSI), and may determine whether or not to divert a cellular call to a non-cellular wireless network by taking into account (or based on) RSSI value and/or other parameters. For example, an RSSI value indicating a strong non-cellular received signal (e.g., RSSI value greater than a threshold value), may support or may base a determination to divert the cellular call to a non-cellular wireless network; whereas, an RSSI value indicating a weak non-cellular received signal (e.g., RSSI value smaller than a threshold value), may support or may base a determination to maintain the cellular call at the cellular wireless network and to avoid diversion of the cellular call to a non-cellular wireless network. Additionally or alternatively, other suitable parameters or methods may be used, in order to determine, measure and/or estimate the Quality of Service (QoS) associate with a wireless communication network (and/or with a downlink thereof, and/or with an uplink thereof), for example, bandwidth estimation methods or tolls (e.g., "Iperf" throughput measurer); and such QoS parameters or estimations, or such bandwidth or throughput estimations, may be used in order to base or support a determination whether or not to divert a cellular phone call to a non-cellular wireless communication network. One or more suitable hardware components and/or software modules may be used, for example, a non-cellular wireless network QoS estimator or measurer or calculator, a non-cellular wireless network bandwidth or throughput estimator or measurer or calculator, or the like.

The present invention may allow a mobile phone or a smartphone to automatically and/or autonomously divert a user-initiated phone call, to be placed via a non-cellular wireless network instead of via a cellular network. Optionally, this may be performed without requesting ad-hoc user permission or ad-hoc user approval for such call diversion, and without requesting approval or permission on a call-by-call basis.

Optionally, the user of mobile phone 110 may be asked only once, for each non-cellular wireless network detected, whether or not subsequent phone calls (or, all subsequent phone calls) are authorized to be carried via the detected non-cellular wireless network. This may allow the user of mobile phone 110 to authorize "in bulk" or in advance, subsequent diverting of phone calls to a particular non-cellular wireless network (e.g., a trusted home network) but not to another non-cellular wireless network (e.g., at a restaurant that the user happened to visit).

Optionally, the user of mobile phone 110 may be asked only once, for each non-cellular wireless network element detected (e.g., wireless router or wireless AP), whether or not subsequent phone calls (or, all subsequent phone calls) are authorized to be carried via the detected non-cellular wireless network. This may allow the user of mobile phone 110 to authorize "in bulk" or in advance, subsequent diverting of phone calls to be performed via a particular non-cellular wireless network element (e.g., a particular high-bandwidth wireless AP in an organization or enterprise) but not to another non-cellular wireless network element (e.g., a wireless AP that is dedicated to servicing a particular type of services or users).

Although portions of the discussion herein may relate, for demonstrative purposes, to diverting a phone call prior to its initiation, or at its initiation, the present invention may be used for other purposes or at other time points, for example, to intercept and/or divert an already-placed cellular phone call, to intercept and/or diver a currently-ongoing cellular phone call, to intercept and/or divert an incoming cellular phone call (e.g., prior to being answered by the user, or after being answered by the user), or in other suitable scenarios.

The term "cellular communication" as used herein may include, for example, wireless communication utilizing a cellular network and/or utilizing a cellular communication standard or protocol, for example, second generation (2G) cellular communication, third generation (3G) cellular communication, Third Generation Partnership Project (3GPP) cellular communication, fourth generation (4G) cellular communication, High-Speed Packet Access (HSPA) cellular communication, Evolved HSPA (or "HSPA+") cellular communication, Global System for Mobile Communications (GSM) cellular communication, General Packet Radio Service (GPRS) cellular communication, Enhanced Data Rates for GSM Evolution (EDGE) cellular communication, Code Division Multiple Access (CDMA) communication standards (e.g., CDMA-2000 or W-CDMA), Universal Mobile Telecommunications System (UMTS) communication, fourth generation Long Term Evolution (4G-LTE) communication, or the like.

The term "non-cellular wireless transceiver" as used herein may include, for example, wireless communication utilizing a network or standard or protocol which are not cellular-based; for example, example, Institute of Electrical and Electronics Engineers (IEEE) 802.11 standard(s), IEEE 802.11a standard, IEEE 802.11b standard, IEEE 802.11g standard, IEEE 802.11n standard, other Wireless Fidelity ("Wi-Fi") standard or protocol, IEEE 802.16 standard(s), Worldwide Interoperability of Microwave Access ("WiMAX") standard, or the like.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" or "a plurality" as used herein include, for example, "multiple" or "two or more". For example, "a plurality of items" includes two or more items.

Some embodiments may take the form of an entirely hardware embodiment, an entirely software embodiment, or an embodiment including both hardware and software elements. Some embodiments may be implemented by using a pre-installed application, a download-able application, an application available for purchase and/or for downloading from an "application store" or a "virtual market" for smartphone applications, an application residing as machine-readable code or program on an article or storage medium (e.g., CD-ROM, flash drive, memory stick, USB flash drive, non-transitory medium or storage medium), or the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments have been illustrated and described herein, many modifications, substitutions, changes, and equivalents may occur to those skilled in the art. Accordingly, the claims are intended to cover all such modifications, substitutions, changes, and equivalents.

What is claimed is:

1. A method of placing a phone call from a mobile phone, the method comprising:
    receiving a user command to initiate a phone call from said mobile phone using a cellular network;
    prior to initiation of said phone call through said cellular network, and instead of initiating said phone call through said cellular network, initiating placement of said phone call to be carried by a detected network element of a non-cellular wireless network, instead of by said cellular network,
    wherein initiating the placement of the phone call through said non-cellular wireless network instead of through said cellular network is based on a Session Initiation Protocol (SIP) account configuration data of a detected network element of said non-cellular wireless network;
    wherein initiating the placement of the phone call through said non-cellular wireless comprises a process which comprises:
    (a) extracting the SIP account configuration data of the detected network element of said non-cellular wireless network; and
    (b) checking whether (A) a value of a field of the SIP account configuration data of the detected network element of said non-cellular wireless network, is identical to (B) a value of a corresponding field of the SIP account configuration data of said mobile phone;
    (c) if the checking of step (b) gives a positive result, then:
        (i) obtaining a Received Signal Strength Indicator (RSSI) value of the non-cellular wireless network; (ii) checking whether the RSSI value of the non-cellular wireless network is greater than a threshold value: (iii) if the RSSI value of the non-cellular wireless network is greater than the threshold value, then determining to initiate placement of the phone call through the non-cellular wireless network instead of through said cellular network; (iv) if the RSSI value of the non-cellular wireless network is not greater than said threshold value, then determining not to initiate placement of the phone call through said non-cellular wireless network,
    wherein the method further comprises:
    for each non-cellular wireless network that is detected, checking only once with the user of the mobile phone whether or not placement of subsequent phone calls are authorized to be diverted to the non-cellular wireless network;
    receiving from the user of the mobile phone a bulk authorization for subsequent phone calls to be diverted at their initiation from the cellular network to a particular authorized non-cellular wireless network.

2. The method of claim 1, wherein said process is performed entirely prior to placement of said phone call.

3. The method of claim 1, wherein said process is performed upon initiation of said phone call by said user.

4. The method of claim 1, wherein said phone call comprises diverting the placement of a non-SIP phone call from said cellular network to said non-cellular wireless network.

5. A method of placing a phone call from a mobile phone, the method comprising:
    receiving a user command to initiate a phone call from said mobile phone using a cellular network;
    prior to initiation of said phone call through said cellular network, and instead of initiating said phone call through said cellular network, initiating placement of said phone call to be carried by a detected network element of a non-cellular wireless network, instead of by said cellular network,
    wherein initiating the placement of the phone call through said non-cellular wireless network instead of through said cellular network is based on a Session Initiation Protocol (SIP) account configuration data of a detected network element of said non-cellular wireless network;
    wherein initiating the placement of the phone call through said non-cellular wireless comprises a process which comprises:
    (a) extracting the SIP account configuration data of the detected network element of said non-cellular wireless network; and
    (b) checking whether (A) a value of a field of the SIP account configuration data of the detected network element of said non-cellular wireless network, is identical to (B) a value of a corresponding field of the SIP account configuration data of said mobile phone;
    (c) if the checking of step (b) gives a positive result, then:
        (i) obtaining a Received Signal Strength Indicator (RSSI) value of the non-cellular wireless network; (ii) checking whether the RSSI value of the non-cellular wireless network is greater than a threshold value; (iii) if the RSSI value of the non-cellular wireless network is greater than the threshold value, then determining to initiate placement of the phone call through the non-cellular wireless network instead of through said cellular network; (iv) if the RSSI value of the non-cellular wireless network is not greater than said threshold value, then determining not to initiate placement of the phone call through said non-cellular wireless network,
    wherein the method further comprises:
    for each non-cellular wireless network that is detected, checking only once with the user of the mobile phone whether or not subsequent phone calls are authorized to be diverted at their initiation to the non-cellular wireless network;
    receiving from the user of the mobile phone a bulk authorization indicating that subsequent phone calls (A) are to be diverted at their initiation from the cellular network to a first particular authorized non-cellular wireless network and (B) are not to be diverted at their initiation to a second, different, non-cellular wireless network.

6. A method of placing a phone call from a mobile phone, the method comprising:
    receiving a user command to initiate a phone call from said mobile phone using a cellular network;
    prior to initiation of said phone call through said cellular network, and instead of initiating said phone call through said cellular network, initiating placement of said phone call to be carried by a detected network element of a non-cellular wireless network, instead of by said cellular network, wherein initiating the placement of the phone call through said non-cellular wireless network instead of through said cellular network is based on a Session Initiation Protocol (SIP) account configuration data of a detected network element of said non-cellular wireless network;

wherein initiating the placement of the phone call through said non-cellular wireless comprises a process which comprises:

(a) extracting the SIP account configuration data of the detected network element of said non-cellular wireless network; and (b) checking whether (A) a value of a field of the SIP account configuration data of the detected network element of said non-cellular wireless network, is identical to (B) a value of a corresponding field of the SIP account configuration data of said mobile phone;

(c) if the checking of step (b) gives a positive result, then: (i) obtaining a Received Signal Strength Indicator (RSSI) value of the non-cellular wireless network; (ii) checking whether the RSSI value of the non-cellular wireless network is greater than a threshold value; (iii) if the RSSI value of the non-cellular wireless network is greater than the threshold value, then determining to initiate placement of the phone call through the non-cellular wireless network instead of through said cellular network; (iv) if the RSSI value of the non-cellular wireless network is not greater than said threshold value, then determining not to initiate placement of the phone call through said non-cellular wireless network, wherein the method further comprises:

for each non-cellular wireless router that is detected, checking only once with the user of the mobile phone whether or not subsequent phone calls are authorized to be diverted at their initiation to the non-cellular wireless network of said non-cellular wireless router;

receiving from the user of the mobile phone a bulk authorization for subsequent phone calls to be diverted at their initiation from the cellular network to a particular authorized non-cellular wireless network that is associated with said non-cellular wireless router.

7. A method of placing a phone call from a mobile phone, the method comprising:

receiving a user command to initiate a phone call from said mobile phone using a cellular network;

prior to initiation of said phone call through said cellular network, and instead of initiating said phone call through said cellular network, initiating placement of said phone call to be carried by a detected network element of a non-cellular wireless network, instead of by said cellular network, wherein initiating the placement of the phone call through said non-cellular wireless network instead of through said cellular network is based on a Session Initiation Protocol (SIP) account configuration data of a detected network element of said non-cellular wireless network;

wherein initiating the placement of the phone call through said non-cellular wireless comprises a process which comprises:

(a) extracting the SIP account configuration data of the detected network element of said non-cellular wireless network; and (b) checking whether (A) a value of a field of the SIP account configuration data of the detected network element of said non-cellular wireless network, is identical to (B) a value of a corresponding field of the SIP account configuration data of said mobile phone;

(c) if the checking of step (b) gives a positive result, then: (i) obtaining a Received Signal Strength Indicator (RSSI) value of the non-cellular wireless network; (ii) checking whether the RSSI value of the non-cellular wireless network is greater than a threshold value; (iii) if the RSSI value of the non-cellular wireless network is greater than the threshold value, then determining to initiate placement of the phone call through the non-cellular wireless network instead of through said cellular network; (iv) if the RSSI value of the non-cellular wireless network is not greater than said threshold value, then determining not to initiate placement of the phone call through said non-cellular wireless network, wherein the method further comprises:

for each non-cellular wireless router that is detected, checking only once with the user of the mobile phone whether or not subsequent phone calls are authorized to be diverted at their initiation to the non-cellular wireless network of said non-cellular wireless router;

receiving from the user of the mobile phone a bulk authorization indicating that subsequent phone calls (A) are to be diverted from the cellular network to a first particular authorized non-cellular wireless network that is associated with said non-cellular wireless router, and (B) are not to be diverted at their initiation to a second, different, non-cellular wireless network that is associated with one or more other non-cellular wireless routers.

* * * * *